July 21, 1959  D. M. MacMILLAN  2,895,166
MOLDS FOR RETREADING OR RECAPPING VEHICLE TIRES
Filed April 30, 1954  2 Sheets-Sheet 1

INVENTOR.
DONALD M. MacMILLAN
BY
ATTORNEY

July 21, 1959  D. M. MacMILLAN  2,895,166
MOLDS FOR RETREADING OR RECAPPING VEHICLE TIRES
Filed April 30, 1954  2 Sheets-Sheet 2

INVENTOR.
DONALD M. MacMILLAN
BY
ATTORNEY

United States Patent Office 2,895,166
Patented July 21, 1959

2,895,166

MOLDS FOR RETREADING OR RECAPPING VEHICLE TIRES

Donald M. MacMillan, Macon, Ga.

Application April 30, 1954, Serial No. 426,658

5 Claims. (Cl. 18—18)

The present invention relates to improvements in molds for recapping or retreading rubber vehicle tires and is a continuation-in-part of my co-pending application Serial No. 331,362 filed January 15, 1953.

It is well known in the tire industry that most, if not all, molds now in use for recapping or retreading pneumatic rubber vehicle tires discolor the white side walls of said tire. Since in the recapping of rubber tire treads, the newly applied tread is cured and shaped under pressure in a mold—this is to say the tire is inflated by a, so-called, tire-bag, thereby forcing the tread into tight contact with the surfaces of the heated mold matrix—it is necessary to support the side walls of the tire during such operation, and, when this support is afforded by a metal flange on the sides of a conventional matrix and is part of the matrix, the heat applied to the matrix will be conducted to these supporting flanges causing a scorching which will discolor the white side wall of a tire, just mentioned. The amount or extent of this scorching, in most cases, does not damage or injure the tire structure sufficiently to endanger its usefulness; but when the tire has a white side wall, this scorching mars the appearance and, in many cases, causes the white lamination of rubber to crack. Furthermore, in a recapping molding press, it is desirable that one attendant may be able to quickly change the matrix sections, carried by relatively movable and opposing pressure plates, and this changing is difficult of accomplishment by one attendant particularly when the pressure plates are in vertically spaced relation and when it is necessary to also remove the matrix heater means, which may be a part of the matrix or separably attached.

The principal object of the present invention is, therefore, to overcome the above drawbacks, particularly in a molding apparatus as shown and described in my United States Letters Patent No. 2,509,830, and to provide an improved organization of parts by which better and more efficient operation and vulcanization of the recapping tread is obtained without the discoloration of the white side wall of pneumatic rubber tires; and, further, to provide this improvement in a relatively inexpensive manner and by a simpler arrangement, than heretofore, of the employed instrumentalities that permits a single attendant to quickly attach and detach matrix sections of the apparatus.

The objects of this invention are, generally, accomplished by having opposing pressure plates, each carrying a heater fixed to the opposing faces of said plates and by imposing matrix sections directly upon opposing faces of each of said heaters, each matrix section being held to its adjacent heater by a split binding or clamping band channeled on its innerface to receive and embrace contiguously abutting and aligned shoulder or flange portions of the separable matrix section and the heater and having its split ends connected by an adjustable fastener; and by employing a, so-called, cold-ring member separate from the matrix sections and insertable in position on at least one of the pressure plates for supporting a white side wall of the tire while under pressure in the heated mold, in lieu of the conventional supporting flange of the matrix, this cold-ring being air-insulated from the heater and from the heated matrix and may be cooled by a cooling medium. The inner surfaces of the opposing walls of the split-band and the surfaces of the shoulder or flange portions, adapted to be contacted thereby, are complementally and cooperatively chamferred whereby, upon tightening of said band, said parts are forced together in intimate contact in heat conducting relation and assure that the matrix and the heater are properly and concentrically aligned in the mold apparatus. Also means are provided that catch and maintain said binding band in approximate association with the heater, when in nonbinding position, so that a matrix may be quickly removed or placed and secured in position by a single attendant.

Other objects of the invention will be apparent from the following specification; and the invention resides in the sundry details of construction, combination and arrangement of parts hereinafter more fully described.

In the drawings, which illustrate the invention in the form in which it is at present devised and which form part of this specification by reference:

Figure 1:
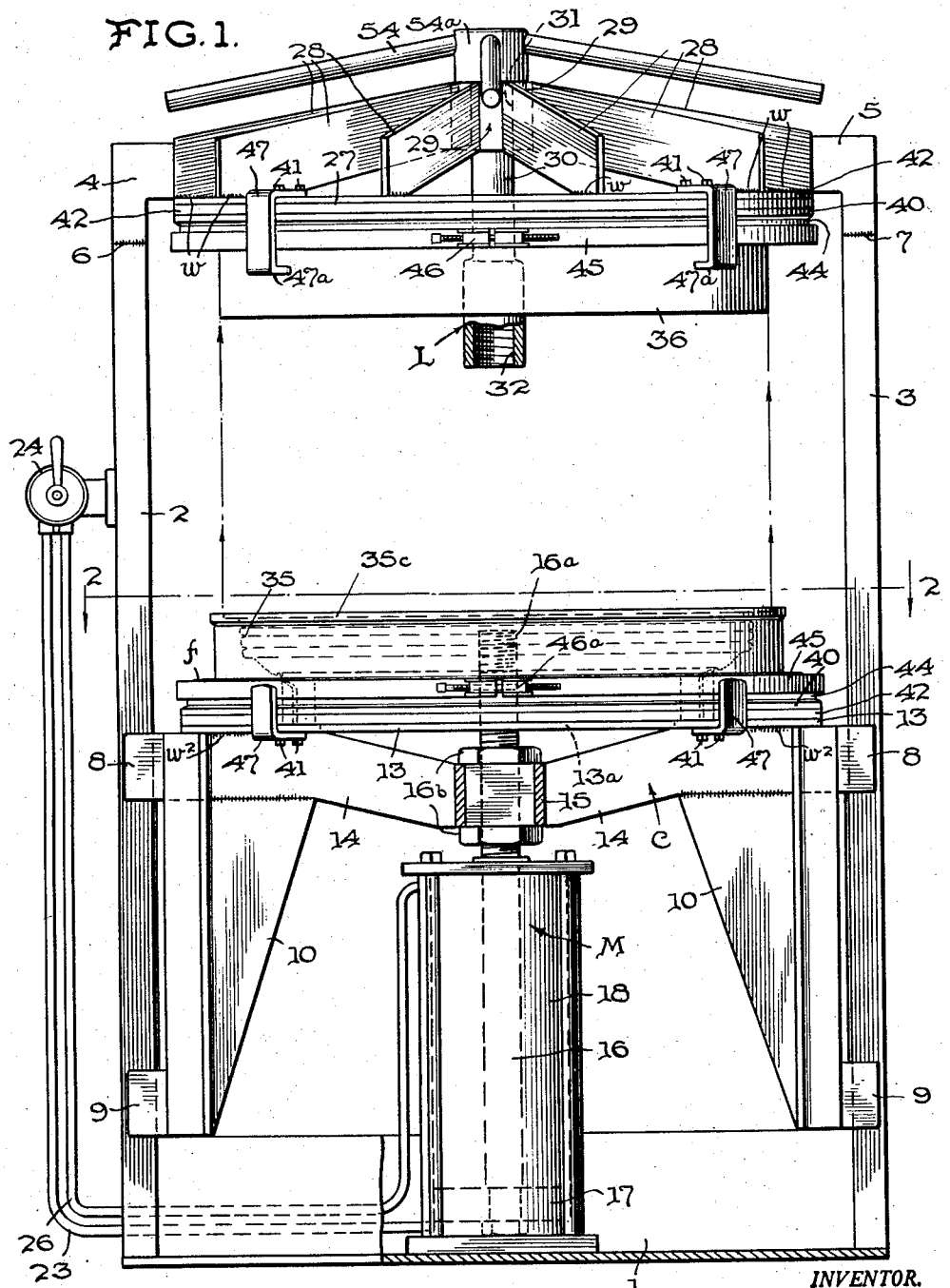
Figure 1 is a side elevation of a tire casing recapping mold aparatus with portions thereof broken away and in section to show the internal construction thereof and equipped with the present invention.

Referring specifically to the drawings, in which like characters of reference refer to similar and like parts throughout the several views, the invention generally described above may be practiced by the aparatus and instrumentalities therein shown, as one example, and which will be now specifically described.

The molding apapratus, to which the present invention may be applied, may comprise a mold press (similar to that disclosed in my aforesaid Letters Patent 2,509,830) which includes a supporting base 1 from which rises oppositely disposed vertical guide posts 2 and 3, each having an inwardly extending bracket 4 and 5 at its upper end secured thereto at 6 and 7, respectively.

Disposed between the guide posts 2 and 3 and secured to the underside of the brackets 4 and 5 is an upper or head metal pressure plate 27 of annular formation. A hub 29 is centrally and axially disposed above the pressure plate 27 and is supported in position by spokes 28 radially extending from said hub and secured, in any suitable manner such as by welding w, to the outer marginal edge portion of the circular pressure plate 27.

Figure 2:
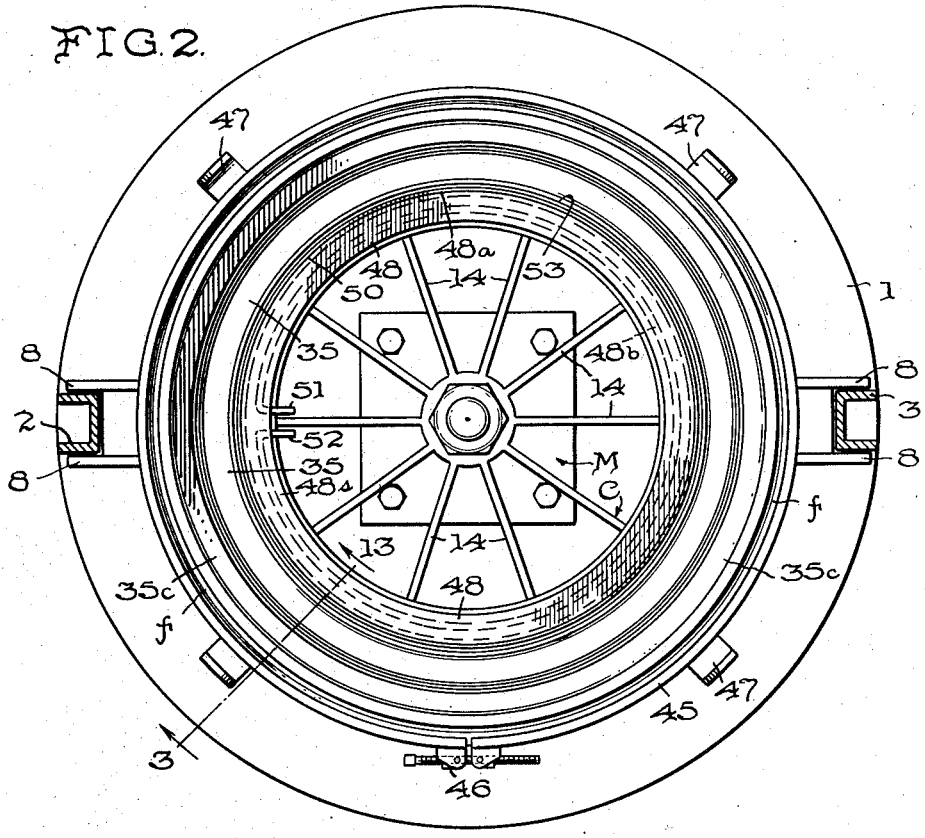
Figure 2 is a transverse sectional view taken substantially on line 2—2 of Figure 1.

A lower or bed annular metallic pressure plate 13 is concentrically disposed below the upper pressure plate 27 and mounted and positioned to be moved toward the upper pressure plate 27 in cooperative relation therewith to close the mold and to be lowered therefrom to open the mold. To this end the plate 13 is mounted upon a spider-type vertically reciprocable carriage C comprising a central hub 15 vertically aligned with the hub 29 and has spokes 14 radiating therefrom, upon the outer end portions of which the plate 13 rests and is secured thereto in any suitable manner, such as by welding as shown at $w^2$ in Fig. 1. The ends of at least two pair of such spokes, on each side of the hub 15, project outwardly and lie on opposite sides of the posts 2 and 3, respectively, to form guide elements 8 in slidable contact with the guide posts, as shown in Figures 1 and 2. In order to add stability to this guiding action, web members 10 project downwardly from said outwardly extending end portions of said pairs of guide-forming spokes 14 for such distance that their lower ends rest upon the base 1 to support the carriage C, when in its lowermost inoperative position shown in Fig. 1, the lower end portions of the webs 10 having lateral guide members 9 extending therefrom and lying on opposite sides of the posts 2 and 3 respectively.

The lower or bed pressure plate 13 is moved upwardly toward the head pressure plate 27 by elevating the carriage C through the means of a motor M. The motor M may be of any suitable type for accomplishing the function mentioned, but is here shown as comprising a fluid actuated piston 17 disposed within a closed cylinder 18 supported centrally on the base 1 and has a piston rod 16 extending therefrom through a packing-gland at the upper end of the cylinder. The end of said piston rod 16, normally extending from said cylinder, is threaded, as at 16$^a$, and extends through the hub 15 and the central opening in the pressure plate 13 and terminates at a distance above said pressure plate 13, as shown in Fig. 1. The piston rod 16 is connected to the hub 15 of the lower pressure plate 13 by nuts 16$^b$ threaded thereon and lying on opposite sides of the hub and overlapping the latter. Fluid, under pressure, may be supplied to opposite sides of the piston head 17 through conduits 23 and 26 controlled by a valve 24.

The opposing faces of the bed and head pressure plates 13 and 27 are adapted to have mold-matrix sections 35 and 36 removably mounted thereon, respectively. The matrix sections are circumferential half sections of the recapping-mold and are concentrically aligned to move into cooperative contacting engagement with each other to complete the tread mold.

A mold locking device L, which locks the matrix sections 35 and 36 together, when the lower pressure plate 13 is moved upward toward the upper pressure plate 27, is carried by the hub 29. The locking device L is in the form of a shaft 30 journalled in said hub, as at 31, and slidable axially therein and, also, has an internally threaded coupler sleeve 32 at its lower end and a hand actuated wheel 54 at its upper end. The coupler sleeve 32 is positioned in cooperative alignment with the threaded extremity 16$^a$ of the piston rod 16 so that the latter will enter the threaded sleeve 32 and, by rotating the hand wheel in one direction, said locking device will bind the matrix sections into tight closed relation and, by rotating the hand wheel in the other direction, will unlock the matrix sections.

The above describes the mold press substantially as shown in the aforesaid Letters Patent as one example of the press to which the improvements of the present invention are applicable.

According to the present invention, a separate matrix heater H is interposed between each pressure plate and its matrix section respectively, the matrix sections being releasably clamped to and held in position against the heater by a binding or clamping means 45 which positively centers said sections and which allows a more facile and quick removal or insertion of matrix sections in the mold press. To this end, the matrix-sections 35 and 36 are each formed with a flat, smooth and wide base-side or face $b$ that are in direct contiguous contact with a similar flat top-side or face of its adjacent heater H and, when the matrix-sections are brought together by the pressure plates to embrace the tire-tread, said sections are pressed into intimate heat conducting contact with said heater H. The heaters H each comprises a metal annulus 40 of high heat conductive material substantially rectangular in cross-section and having an electric heating element 43 embedded or cast into the central portion with suitable terminals (not shown) for connection with a current supply source. The electric-heating element 43 is of the so-called, tubular or ribbon type, consisting of an elongated resistance member $x$ surrounded by dielectric insulation $y$ and enveloped in an outer metal shielding tube $z$. The outer circumference of each heater member 40 is substantially that of an outer circumferential flange $f$ of the adjacent matrix section so that said base-sides of said matrix sections may be arranged against and in substantial concentric alignment with said heater members 40 and have intimate heat conducting contact therewith over a relative wide area but, preferably short of the inner circumference of the adjacent matrix section. The heater members 40 are fixedly secured to the opposing surfaces of said pressure plates 13 and 27, respectively, by means of bolts 41 and each has interposed between it and its pressure plate 13 or 27 an annular layer of insulation 42, preferably of asbestos mill board one-half ($\frac{1}{2}''$) inch thick and co-extensive with the opposing face of the heater member 40. Since both heater annuli 40 and both matrix sections 35 and 36 are the same, a detail description of one heater 40 and of one matrix section will suffice for the other.

Each annulus 40 has its outer circumferential face formed with a V-shaped groove 44 therearound. The adjacent perimetrical flange $f$ of each matrix section 35 and 36 has one face which forms a continuing portion of its base-side or face $b$ and, since said base-sides $b$ are adapted to bear against their respective and adjacent annular heater members 40, each matrix section, when so positioned, may be clamped and held in position by a split channel-band 45 sprung in position therearound with one wall or leg of the channel extending into the groove 44 in the heater member 40 and the other wall or leg in overlapping engagement with the flange $f$ on the matrix base. The inner surfaces of the side walls of the split channel band 45 are tapered or chamferred outwardly, as at $t$, and the surfaces of the groove 44 and flange $f$ engaged by the side walls of the channel band 45 are complementally tapered so that, when the split ends of the band 45 are fastened together, as by means of a turnbuckle 46 connecting said ends or other suitable means, said chamferred surfaces ride one on the other and force the base $b$ of matrix sections 35 or 36 against its heater member 40 into intimate contiguous contact, thus removably binding and holding the parts together in aligned position.

Brackets 47 are disposed about the perimeters of the pressure plate 13 and 27 at spaced intervals and may be secured in position thereto by the bolts 41 which also hold the annuli 40 to their respective pressure plates and are so arranged to catch the matrix holder-bands 45 when the latter are loosened and expanded. The brackets 47 employed on the lower pressure plate 13 are in the form of outwardly and upwardly extending fingers while those employed on the upper pressure plate 27 are inversely positioned (i.e., outwardly and downwardly) and, further, have their lower end 47$^a$ extending inwardly for a distance and below the upper matrix section base flange $f$ so as to temporarily catch and support the holder-band 45, when released from the upper pressure plate 27, thus permitting one attendant to change the matrix section.

The cross-sectional area of the tread mold may be increased, for tires of larger diameter, by the employment of matrix spacer-ring means (not shown) adapted to be removably secured to the matrix sections in a manner well understood in the art.

Figure 3:
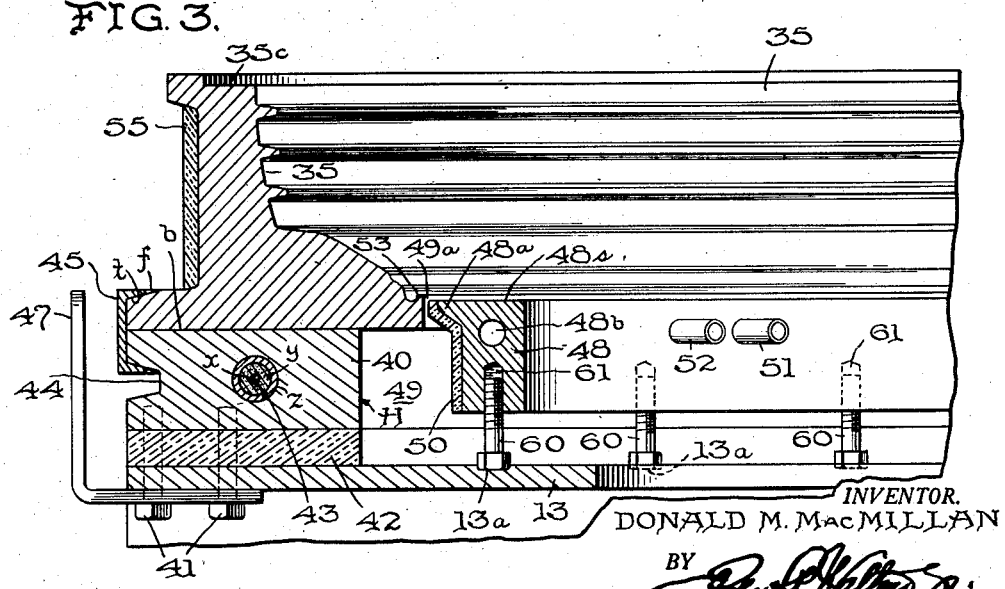
Figure 3 is an enlarged detailed sectional view of one of the matrix sections and heater ring therefor together with the insulating plate and pressure plate used for supporting the matrix section taken substantially on line 3—3 of Figure 2.

In order to prevent the scorching of the white side wall of the tire being recapped, as mentioned above, a, so-called, "cold-ring" 48 is placed horizontally on the bed pressure plate 13 and arranged concentrically within and in spaced relation to the inner circumference of its annular heating element 40 to have its upper side surface 48$^s$ lie substantially in the plane of the side walls of the tire extending inwardly from the matrix and which tire is under pressure during the curing operation. Since white-wall tires are made with a lamination of white rubber only on one side wall, there is here shown only one cold ring 48 positioned on the lower pressure plate 13 and the width or cross sectional thickness of the cold ring 48 may be such as will give proper support to the tire side wall. The diameter of the ring is, preferably, considerably less than the inner diameter of the annular heater member 40 and of the matrix section, as shown particularly in Figure 3, which, together with the inner diameter of the heater-member 40 being greater than that of the matrix, provides a relatively wide insulating air space 49 therebetween (see Figure 3). The top side 48$^s$ of the cold ring 48, positioned to contact the side wall of the tire wall to be supported, may be provided, however, at its outer circumferential edge portion with an outwardly radially projecting circumferential lip 48$^a$ adapted to extend partially across the air space 49 and lie within a slight distance from the matrix so as to be spaced therefrom.

In order to communicate the air space 49 with cooler atmospheric air to reduce the absorption of heat by the cold ring, the under-side of the cold ring 48 is provided with a series of spaced supporting legs 60, the free ends of which rest directly upon the bed pressure plate 13. These legs 60 may be, and preferably are, in the form of headed-bolts adjustably threaded into threaded openings 61 in the under-side of the cold rings so that, by adjusting the bolts 60, the proper height of the top-surface 48$^s$ of the cold ring 48 may be maintained in relation to the lip of matrix 35 and to compensate for the compressing of the insulation 42, due to the frequent opening and closing of the matrix sections and the pressure involved or due to different thickness of the side walls of the matrix section that may be employed in the apparatus from time to time. Also, if desired in certain instances, the external circumference of the cold ring 48, as well as of the lip 48$^a$, may be lined with an insulation material 50, preferably asbestos mill board of about one-quarter (¼) of an inch thick, as shown, to further insulate the cold ring 48 from the heat emitted into the space 49 by the heater 40 or the matrix section 35, this lining 50 being held in place by any suitable means such as an adhesive or by metal straps, not shown. The bed pressure plate 13 may be provided with depressions 13$^a$ positioned and arranged to receive the free end of the legs 60 and to properly center the cold-ring 48 with respect to the inner circumference of the matrix section 35.

It is also desirable that the cold ring 48 be cast with a passage 48$^b$ therein extending substantially co-extensive thereof, one end of the passage having an externally projecting inlet nipple 51 and the other end having an outlet nipple 52, each adapted to be connected with a hose connection, not shown, by which a cooling medium may be circulated through said cold ring 48 from a suitable source of supply. The cooling medium may be cool or cold water or air and the dimensions of the passage 48$^b$ may be such as will keep the ring 48 cold or cool enough so that the tire wall, being supported thereby, will not become scorched. By having the insulation 50 of suitable thickness, it is possible to omit the cooling passage 48$^b$ or, if the cooling passage 48$^b$ is of adequate capacity, it is possible to eliminate the insulation 50. However, the utilization of both the cooling passage 48$^b$ and the insulation 50 assures a "cold" ring 48. It will be noted that, in all cases where the lip 48$^a$ is employed on the cold ring 48, it is dimensioned to leave a relatively narrow gap 49$^a$ between it and the inner surface of the matrix to prevent direct heat transfer to cold ring from the matrix-section (see Figure 3).

In order to prevent the molten rubber, of the tread of the tire being being cured, from running out of the matrix into the gap 49$^a$, the inner edge of the matrix surface is provided with a raised inwardly extended circumferential head 53 (Fig. 3) disposed at a point where the tread merges with the side wall of the tire. When a recapped or retreaded tire is being cured in the closed matrix sections 35 and 36 and pressure is applied internally of the tire, as by so-called "curing bags," which expands the tire, and its tread against the inner surfaces of the matrix sections, the bead 53 is forced tightly against the tire surface and effectively seals off the molten rubber at the tread portion. It will be understood, of course, that both matrix sections 35 and 36 will or may be provided with the bead 53.

It will be further noted that the cold ring 48 may be placed on the bottom pressure plate 13 of the mold and no fastening devices are needed, it only being necessary to center the ring on the pressure plate. Consequently, the cold ring can be lifted out of position with ease when necessary or when it is desired not to use it. On the other hand, however, where it is desired to use a cold ring 48 in connection with the upper pressure plate 27, it is only necessary to provide a matrix-section 36 similar to section 35 (i.e., without tire side wall supporting flanges or wings) and to secure the cold ring in position by bolts, not shown, to the pressure plate 27.

The matrix sections 35 and 36 will be heated by conduction from their heater members 40 against which they contact; and, in order to prevent the dissipation of the heat from the matrix sections by radiation at their exterior surfaces opposite their interior tread forming surfaces, said exterior surface of each is wrapped with a suitable thickness of heat-insulation material 55, thus confining and intensifying the heat at the tread surface area of the tire being recapped.

In operation, the carriage C will be lowered, through operation of the piston 17 in cylinder 18, to separate the lower matrix section 35 from the upper matrix section 36, after the hand-wheel 54 has been operated to disconnect the coupling 32 from the threaded end 16$a$ of the piston rod 16. With the parts in the position as shown in Figure 1, a tire casing, having recapping material on its tread, may be placed upon the matrix section 35 in a manner well understood in the art. Fluid pressure is then admitted to the cylinder 18 to move the piston 17 upwardly, causing the carriage C to elevate the matrix section 35 until it is disposed in contiguous complemental engagement with the upper matrix section 36 and the threaded end 16$^a$ of the piston rod contacting with the threaded coupling sleeve 32. This contact of the coupling 32 by the piston rod 16 will cause the mold locking device L to move upwardly for a distance, as the shaft 30 is slidable in the hub 29. Then, by rotating the hand wheel 54, the coupling 32 will be caused to thread down upon the threaded end 16$^a$ of the piston rod 16 until the hub 54$^a$ of the hand wheel 54 bears upon hub 29, whereby locking and supporting said matrix sections in their closed positions for a recapping curing operation of the tire casing held therein.

From the above description and the annexed drawings, it is apparent that the above stated objects of the invention may be attained thereby and that the advantages of the improved construction permits quicker operation and simpler manipulation in addition to providing against the discoloration of white side wall tires.

Having thus described the invention in the form in which the same is now constructed, it is to be understood that the invention is not to be limited to the exact form herein described and shown as it is susceptible to many changes and variations and at is to be limited only by the spirit of the invention and the scope of the appended claims.

That which is claimed, as new, is:

1. In a vehicle tire recapping apparatus, an annular pressure plate, a heater ring secured to said plate, insulating material interposed between said ring and plate, an annular retreading molding matrix section of heat conducting material removably mounted on said heater ring, said matrix section having a radial flange projecting outwardly therefrom in heat conducting contact with said heater ring, said heater ring having its outer diameter substantially equal to the diameter of said outwardly projecting flange, said heater ring having a circumferential groove in the outer surface thereof, means for securing said matrix section and heater ring together and comprising a channel form split band having one leg of the channel engaging said groove and the other leg embracing the outwardly projecting radial flange of the matrix section, and adjustable fastener means at the split ends of the band whereby it may be fastened into and unfastened from its securing position.

2. The apparatus defined in claim 1, wherein said matrix section has a circumferential bead at its inner periphery, in horizontal alignment with the outwardly projecting extension forming a groove opening away from said heater ring for preventing recapping material from flowing toward the side wall of a tire carcass being recapped.

3. The apparatus set forth in claim 1, including a cold ring supported on the pressure plate in a position for engaging a side wall of a tire carcass and spaced circumferentially well inwardly of the heater ring to provide an air space therebetween; said cold ring including a thin annular lip extension extending into the central opening of the matrix section and spaced a limited distance inwardly therefrom, and said cold ring support including adjustable screws depending from said cold ring and resting on the pressure plate, said plate including means engageable by the heads of the screws for effecting an accurate centering of the cold ring within the central opening of the annular matrix section.

4. In a vehicle tire molding apparatus, a pair of circular heater rings mounted to move relatively toward and away from each other, cooperating separable molding matrix sections adapted to be removably secured to opposing faces of said rings, respectively, a channel-form split-band for each ring embracing and surrounding adjacent concentric portions of said ring and its matrix section for aligning and securing said matrix section to its heater ring, adjustable fastener means at the split ends of said band, whereby said split-band may be fastened into and unfastened from its holding position, and supporting brackets radially extending from said rings and formed and positioned to support said split-bands, when the latter are unfastened to release their respective matrix sections.

5. In a vehicle tire molding apparatus, a pair of superposed circular heater rings mounted to move relatively toward and away from each other, cooperating separable molding matrix sections adapted to be removably secured to opposing faces of said rings, respectively, a channel-form split-band for each ring embracing and surrounding adjacent concentric portions of said ring and its matrix section for aligning and clamping said matrix section to its heater ring, adjustable fastener means at the split ends of said band, whereby said split band may be fastened into and unfastened from its holding position, and brackets radially depending from the upper heater ring and having inwardly directed lower ends adapted to catch and temporarily hold the upper split band when the upper split band has been unfastened to release the upper matrix section.

References Cited in the file of this patent

UNITED STATES PATENTS

| | | |
|---|---|---|
| 1,852,886 | Jones | Apr. 5, 1932 |
| 2,020,023 | Flynn | Nov. 5, 1935 |
| 2,155,906 | Rihn et al. | Apr. 25, 1939 |
| 2,228,212 | Heintz | Jan. 7, 1941 |
| 2,315,770 | Cleveland | Apr. 6, 1943 |
| 2,319,447 | Drennan | May 18, 1943 |
| 2,375,784 | Glynn | May 15, 1945 |
| 2,422,788 | Kraft | June 24, 1947 |
| 2,456,063 | James | Dec. 14, 1948 |
| 2,509,830 | MacMillan | May 30, 1950 |

FOREIGN PATENTS

| | | |
|---|---|---|
| 833,249 | Germany | Mar. 6, 1952 |